Patented Oct. 4, 1932

1,880,404

UNITED STATES PATENT OFFICE

EDGAR C. BRITTON AND LINDLEY E. MILLS, OF MIDLAND, MICHIGAN, ASSIGNORS TO THE DOW CHEMICAL COMPANY, OF MIDLAND, MICHIGAN, A CORPORATION OF MICHIGAN

DINITRO-ORTHO-CYCLOHEXYLPHENOL

No Drawing.   Application filed September 29, 1930.   Serial No. 485,295.

The present invention is concerned with the making of cyclohexylphenol compounds and more particularly dinitro-ortho-cyclohexylphenol, a new compound.

We have discovered that dinitro-ortho-cyclohexylphenol, a new chemical compound, may be prepared in good yield and of high purity by reacting ortho-cyclohexylphenol successively with sulphuric and nitric acids. The following structural formula probably represents our new compound:—

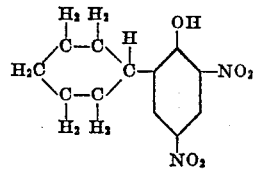

We have further found our new compound, dinitro-ortho-cyclohexylphenol, to form well-defined salts, for instance, with inorganic bases, such as ammonia, calcium hydroxide, sodium hydroxide, and also with organic bases, such as triethanol amine, nicotine, etc.

Our invention, then, consists of the method, and new product hereinafter fully described and particularly pointed out in the claims, the following description setting forth in detail one mode of carrying out the invention, such disclosed mode illustrating, however, but one of various ways in which the principle of the invention may be used.

In carrying out our method for making dinitro-ortho-cyclohexylphenol, ortho-cyclohexylphenol and concentrated sulphuric acid are mixed in a cast iron digestor or other suitable vessel equipped for internal agitation and warmed at a temperature of 60° to 70° C. until the mixture is practically completely converted to the sulphonic acid of the ortho-cyclohexylphenol. The mixture is now dissolved in a quantity of water, equal to about twice that of said mixture and sufficient concentrated nitric acid is gradually added to convert the sulphonic acid to the nitro derivative, a temperature of about 70° being maintained meanwhile in the reaction mixture. Yellow crystals of dinitro-ortho-cyclohexylphenol begin to separate out almost from the time of first introducing the nitric acid. The reaction mixture after further dilution with from 6 to 8 times its volume of water is heated to 85° to 90° C. for 1 to 2 hours, when the nitration is complete. The crystals are now filtered and washed with cold water in the usual way until practically free from acid. Through such procedure, dinitro-ortho-cyclohexylphenol has been obtained in amount corresponding to from 80 to 85 per cent of the theoretical yield, based on the quantity of ortho-cyclohexylphenol used. The product as obtained directly has a melting point of about 104° C. and after recrystallization from alcohol the purified product has a melting point of 106° C.

The following example illustrates one mode of carrying out our invention:—

*Example 1*

A mixture of 176 grams (1 mole) of ortho-cyclohexylphenol and 197 grams (approximately 2 moles) of concentrated sulphuric acid (specific gravity 1.665) was heated in a glass lined vessel and agitated at a temperature of 60° to 70° C. for about ¼ hour and then poured into about 700 grams of water contained in a vessel similar to that described above. The solution was warmed to about 70° C. and then 236 grams (about 2 moles) of nitric acid (sp. gr. 1.4) was gradually added with stirring. The aqueous nitric acid mixture was then further diluted with 3500 grams of water and the temperature of the diluted mixture maintained at 85° to 90° for 1½ hours when the formation of the yellow crystals of dinitro-ortho-cyclohexylphenol was complete. The crystals were filtered and thoroughly washed with cold water. A yield of 218 grams of dinitro-ortho-cyclohexylphenol of melting point 104° C., or approximately 82 per cent of the theoretical yield of product, calculated on the quantity of ortho-cyclohexylphenol used, was obtained. The recrystallized product had a melting point of 106° C.

Our invention consists in dinitro-ortho-cyclohexylphenol, a new compound, and a process for making the same. Our new compound or its salts are useful as insecticides for destroying and controlling sucking and soft bodied insects, such as aphis, red spider, apple sucker, etc., and may be applied for such purpose in solution or suspension in water or in other liquid medium, or in combination with other insecticidal materials.

Other modes of applying the principle of our invention may be employed instead of those explained, change being made as regards the process herein disclosed, provided the means and ingredients stated by the following claims or the equivalent of such stated means be employed.

We therefore particularly point out and distinctly claim as our invention:—

1. As a new compound, dinitro-ortho-cyclohexylphenol, a substituted cyclohexylphenol characterized by the formula

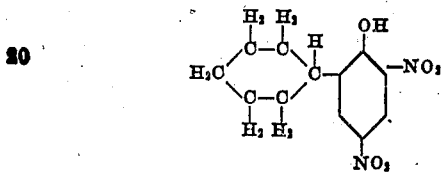

2. As a new compound, dintro-ortho-cyclohexylphenol, the same characterized as crystallizing in the form of yellowish-white crystals, insoluble in cold water, soluble in alcohol, and having a melting point of 106° C.

3. A method of making a cyclohexyl substituted nitrophenol which comprises reacting a cyclohexyphenol with sulphuric acid to form the sulphonic acid of the former, and reacting said sulphonic acid with nitric acid to form a cyclohexyl substituted nitrophenol.

4. A method of making a dinitro-cyclohexyphenol which comprises reacting a cyclohexylphenol with sulphuric acid to form the sulfonic acid of the former, and reacting said sulfonic acid with nitric acid to form a dinitro-cyclohexylphenol.

5. In a method of making dinitro-ortho-cyclohexylphenol, the steps which consist in reacting ortho-cyclohexylphenol with concentrated sulphuric acid at a temperature between about 60° and 70° C. to form a sulphonic acid of the former, reacting an aqueous solution of said sulphonic acid with concentrated nitric acid at temperatures between approximately 85° and 90° C. to form substantially, dinitro - ortho - cyclohexylphenol separating the latter and washing the same with water.

Signed by us this 24th day of September, 1930.

EDGAR C. BRITTON.
LINDLEY E. MILLS.